United States Patent
Barois et al.

(10) Patent No.: US 12,160,280 B2
(45) Date of Patent: Dec. 3, 2024

(54) METHOD AND DEVICE FOR TRANSMITTING A MESSAGE

(71) Applicant: SAGEMCOM ENERGY & TELECOM SAS, Rueil Malmaison (FR)

(72) Inventors: Jérôme Barois, Rueil Malmaison (FR); Clément Terrien, Rueil Malmaison (FR)

(73) Assignee: SAGEMCOM ENERGY & TELECOM SAS, Bois-Colombes (FR)

(*) Notice: Subject to any disclaimer, the term of this patent is extended or adjusted under 35 U.S.C. 154(b) by 168 days.

(21) Appl. No.: 17/886,262

(22) Filed: Aug. 11, 2022

(65) Prior Publication Data
US 2023/0067894 A1  Mar. 2, 2023

(30) Foreign Application Priority Data
Aug. 26, 2021 (FR) ...................................... 2108918

(51) Int. Cl.
H04B 3/54 (2006.01)
H04B 7/24 (2006.01)

(52) U.S. Cl.
CPC ............... H04B 3/542 (2013.01); H04B 7/24 (2013.01)

(58) Field of Classification Search
CPC . H04B 3/46; H04B 3/54; H04B 3/542; H04B 7/24; H04B 2203/5433; H04B 1/401
See application file for complete search history.

(56) References Cited

U.S. PATENT DOCUMENTS

| | | | |
|---|---|---|---|
| 2011/0235536 A1* | 9/2011 | Nishizaka | H04B 7/155 370/252 |
| 2012/0134395 A1 | 5/2012 | Varadarajan et al. | |
| 2014/0328355 A1* | 11/2014 | Sugimoto | H04L 1/0031 370/476 |
| 2016/0028438 A1* | 1/2016 | Sun | H04B 1/123 375/219 |
| 2021/0226666 A1* | 7/2021 | Varesio | H04L 45/26 |

(Continued)

OTHER PUBLICATIONS

Cédric Lavenu, ISPLC 2020, G3-PLC Alliance, (Year: 2020).*
(Continued)

*Primary Examiner* — Aristocratis Fotakis
(74) *Attorney, Agent, or Firm* — Williams Mullen; R. Brian Drozd

(57) ABSTRACT

A method and device for transmitting a message from a first node device to a second node device, the devices using powerline communications. The first node device is able to send and receive fragments of the message on at least one frequency band using powerline communications and over a radio channel. The first node device, prior to the transmission of the fragment: estimates, for at least one frequency band, the theoretical duration of transmission of the fragment on the frequency band, and for the radio channel, the theoretical duration of transmission of the fragment on the radio channel, obtains, from a database, the result of integration of the degree of occupation of the frequency band and of the result of integration of the degree of occupation of the radio channel, selects, from the results of integration, the frequency band or the radio channel and transmits the fragment.

8 Claims, 4 Drawing Sheets

(56) References Cited

U.S. PATENT DOCUMENTS

2021/0306030 A1* 9/2021 Varesio ............... H04B 3/542
2021/0400766 A1* 12/2021 Tzou .................. H04W 88/06

OTHER PUBLICATIONS

Recommendation ITU-T G.9903 (2017)—Amendment 1, Series G: Transmission Systems and Media, Digital Systems and Networks, Access networks—In premises networks, Narrowband orthogonal frequency division multiplexing power line communication transceivers for G3-PLC networks, May 2021 (Year: 2021).*

AN5603, ST G3-PLC Hybrid Solution, STMicroelectronics, 2021 (Year: 2021).*

May 12, 2022 Search Report issued in French Patent Application No. 2108918.

* cited by examiner

METHOD AND DEVICE FOR TRANSMITTING A MESSAGE

TECHNICAL FIELD

At least one embodiment relates to a method for transmitting a message from a first node device to a second node device belonging to a neighbourhood of the first node device, said first and second node devices belonging to an RF hybrid powerline communication network. At least one embodiment relates to a device implementing the method.

PRIOR ART

Powerline communications PLC are developing, in particular in the context of electrical supply networks of the AMM type (the acronym signifying "automated meter management"). Communication networks are thus implemented in electrical supply networks for the automated collection, by a base node device (also referred to as a "data concentrator") in the network, from smart electricity meters, of energy consumption reading data that said smart electricity meters are respectively responsible for monitoring.

The G3-PLC communication standard is defined to enable the various node devices (in particular data concentrator and smart electricity meters) in such a network to communicate with each other. The standard is specified in the ITU-T recommendation G.9903, which describes in particular the physical layer (PHY) and the data link layer (DLL) of the OSI model (the acronym for "Open Systems Interconnection"). The G3-PLC standard is intended to be used in frequency bands ranging from 10 to 490 kHz. It supports more particularly the following frequency bands: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of bit rate, range and resistance to disturbances, in particular.

In a development of the G3-PLC standard defined in an Annex H of the ITU-T recommendation G.9903 (2017) Amendment 1 (May 2021), called G3-PLC Hybrid PLC & RF, an RF (the acronym for radio-frequency) radio channel can be used in place of one of said PLC frequency bands. More precisely, this version of the standard allows the occasional use of a secondary radio physical layer based on a SUN FSK modulation as defined in IEEE 802.15.4:2015. Thus, by using the various G3-PL and RF media for transmitting data, the electrical supply network maximises its coverage and its resilience. An electrical-supply network node capable of sending and receiving data using the two media (PLC and RF) is called a hybrid node.

However, in G3-PLC Hybrid PLC & RF, the choice of communicating between two hybrid nodes in the communication network using either a PLC frequency band or an RF radio channel is determined at the time of connection or reconstruction of the communication routes.

For example, beacon request messages or broadcast frame messages are sent by a hybrid node simultaneously on the two PLC and RF media while the messages intended for a single node (unicast frame) are transmitted only on one of the two media and the messages intended for a single node are acknowledged only on the medium on which the message was received.

This choice of the communication medium used between two hybrid nodes in the network is generally fixed for several hours. The G3-PLC Hybrid PLC & RF standard defined in Amendment 1 (May 2021) therefore does not make it possible to use the full flexibility offered by PLC/RF hybridisation.

It is desirable to overcome these various drawbacks of the prior art. It is in particular desirable to propose a communication method that makes it possible to use the two communication media dynamically, in this case at least one frequency band of the electrical supply network using powerline communications and a radio channel.

DISCLOSURE OF THE INVENTION

For this purpose, according to a first aspect, the invention proposes a method for transmitting a message from a first node device to a second node device belonging to a neighbourhood of said first node device, said first and second node devices belonging to an electrical supply network using powerline communications, characterised in that the first node device is able to send and receive fragments of the message on at least one frequency band of the electrical supply network using powerline communications and over a radio channel and in that the method is executed by the first node device and comprises the steps, prior to the transmission of the fragment, of:

estimating, for the radio channel, the theoretical duration of transmission of the fragment over the radio channel, estimating a cumulative degree of use, by the node device, of the radio channel while considering that the fragment is transmitted over the radio channel and, if the degree of use estimated is below a maximum use threshold, the method comprises the steps of:| estimating, for the at least one frequency band, the theoretical duration of transmission of the fragment on the at least one frequency band, obtaining, from a database, the result of integration of the degree of occupation of the at least one frequency band determined during several timescales corresponding to the theoretical duration of transmission of the fragment on the at least one frequency band, obtaining, from the database, the result of integration of the degree of occupation of the radio channel determined during several timescales corresponding to the theoretical duration of transmission of the fragment over the radio channel, selecting, from the results of integration of the degree, the at least one frequency band or the radio channel, transmitting the fragment on the at least one frequency band or over the radio channel according to the selection.

The invention also relates to a device for transmitting a message from a first node device to a second node device belonging to a neighbourhood of said first node device, said first and second node devices belonging to an electrical supply network using powerline communications, characterised in that the first node device is able to send and receive fragments of the message on at least one frequency band of the electrical supply network using powerline communications and over a radio channel, and in that the first node device, prior to the transmission of the fragment, activates:

means for estimating, for the radio channel, the theoretical duration of transmission of the fragment over the radio channel, means for estimating a cumulative degree of use, by the node device, of the radio channel while considering that the fragment is transmitted over the radio channel and, if the degree of use estimated is below a maximum use threshold, the method comprises the steps of:| means for estimating, for the at least one frequency band, the theoretical duration of transmission of the fragment on the at least one frequency band, means for obtaining, from a database, the result of integration of the degree of occupation of the at least one frequency band determined during several timescales corresponding to the theoretical duration of transmission of the fragment on the at least one frequency band, means for obtaining, from the database, the result of integration of the degree of occupation of the radio channel determined during several timescales corresponding to the theoretical duration of transmission of the fragment over the radio channel, means for selecting, from the results of integration of the degree, the at least one frequency band or the radio channel, means for transmitting the fragment on the at least one frequency band or over the radio channel according to the selection.

Thus the present invention makes it possible to benefit from the advantages, in terms of transmission rate, range and resistance to disturbance, of the at least one frequency band or of the radio channel.

In addition, by determining the degree of occupation of the at least one frequency band and of the radio channel over several timescales, it is possible to take into account and to anticipate the cyclic variations in the occupation of the communication network. The cyclic variations in the occupation of the communication network are linked for example to the cyclic interrogations by a concentrator to obtain load curves for the meters. These interrogations can be done according to an hourly, daily or other periodicity.

According to a particular embodiment of the invention, if the degree of use estimated is not below a maximum use threshold, the method comprises the step of transmitting the fragment on the frequency band.

According to a particular embodiment of the invention, the results of integration of the degree of occupation of the or each frequency band and of the radio channel are determined during three timescales, a second timescale being longer than a first timescale and shorter than a third timescale.

According to a particular embodiment, the first timescale is the minute, the second timescale is the hour, and the third timescale is the day.

According to a particular embodiment of the invention, the database stores results of integration of the degree of occupation of the at least one frequency band and of the radio channel determined during the first timescale over a period of one hour, stores results of integration of the degree of occupation of the at least one frequency band and of the radio channel determined during the second timescale over a period of twenty-four hours, and stores results of integration of the degree of occupation of the at least one frequency band and of the radio channel determined during the third timescale over a period of one week.

According to a particular embodiment of the invention, the at least one frequency band forms part of a set of frequency bands comprising:

the CENELEC A frequency band;
the CENELEC B frequency band; and
the FCC frequency band or the ARM frequency band.

The present invention also relates to a computer program product. It comprises instructions for implementing, by a node device, the method according to one of the previous embodiments, when said program is executed by a processor of the node device.

The present invention also relates to a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
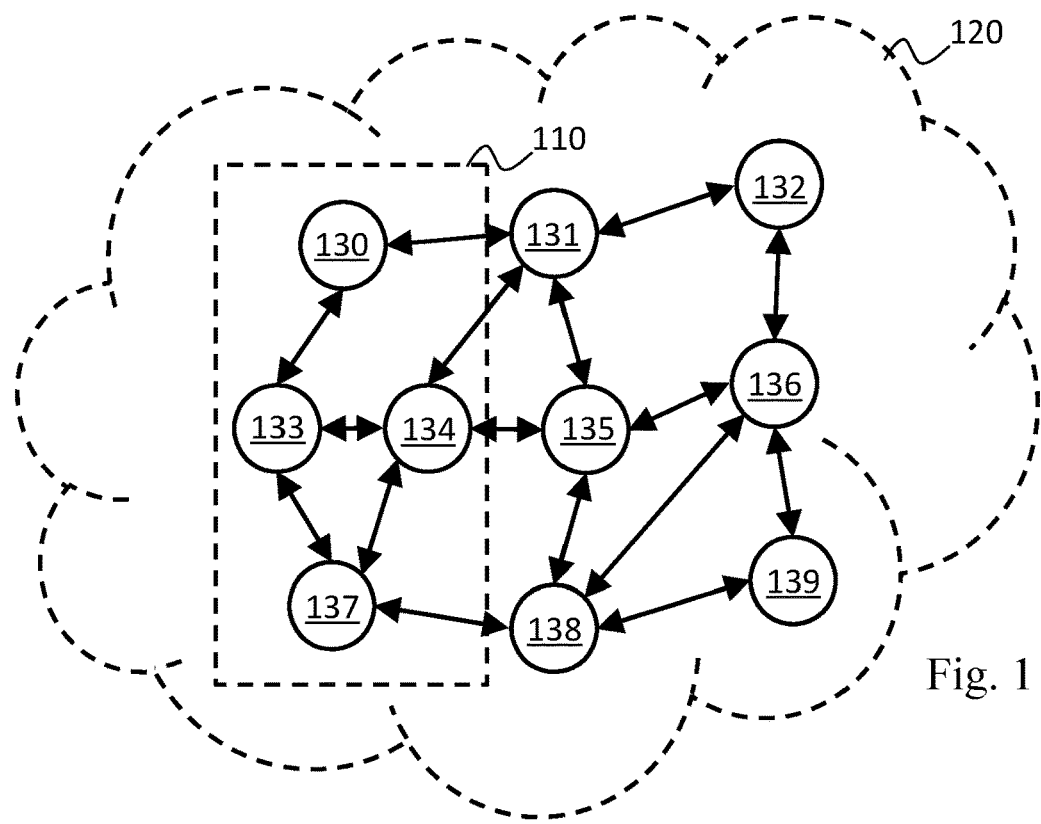
FIG. 1 illustrates schematically a communication network according to one embodiment.

FIG. 1 illustrates schematically a mesh communication network 120. The mesh communication network 120 is for example an electrical supply network of the AMM type. The mesh communication network 120 relies on powerline communications PLC or radio-frequency RF communications for enabling a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of communications in the mesh communication network 120, as detailed below. Thus, one and the same smart electricity meter potentially has available several paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (May 2021) and more particularly in Annex H.

The mesh communication network 120 thus comprises a plurality of node devices 130, 131, 132, 133, 134, 135, 136, 137, 138, 139. A network neighbourhood is associated with each node device in the mesh communication network 120. On FIG. 1, the node device 133 is associated with a network neighbourhood 110 encompassing node devices 130, 134 and 137. This is because, in the mesh communication network 120, a signal or a message broadcast by a node device (such as the node device 133) is in general not visible at every point in said communication network. Each node device sending signals or messages then has a network neighbourhood, i.e. a subset of said mesh communication network 120 wherein any node device can intelligibly receive said signals or message directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type, which rely on a global knowledge of network topology, the routing protocols of the reactive type rely on on-demand route discoveries, each node device in the network then needing solely to have knowledge of its own network neighbourhood to route data in the mesh communication network 120.

In terms of frequency bands that can be used in the context of the implementation of the mesh communication network 120, mention can be made of: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz, and the RF radio channel, which ranges approximately from 863 MHz to 870 MHz. It is then possible to use: a first thirty-six carrier modulation scheme in the CENELEC A frequency band; a second seventy-two carrier modulation scheme in the FCC frequency band; a third fifty-four carrier modulation scheme in the ARIB frequency band; a fourth sixteen carrier modulation scheme in the CENELEC B frequency band and a fifth modulation scheme of the SUN-FSK type for the RF radio channel of G3-PLC Hybrid PLC & RF. The SUN-FSK modulation is defined in section 20 of the document IEEE 802.15.4:2015.

Figure 2:
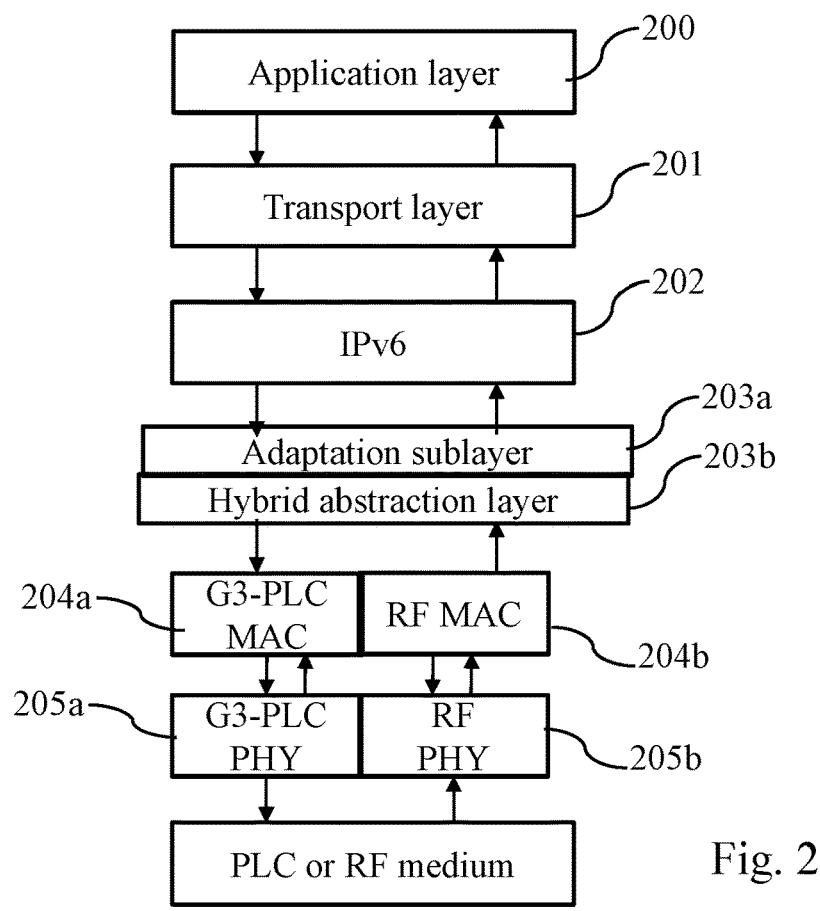
FIG. 2 illustrates schematically the various layers of an OSI model in the particular case of the G3-PLC Hybrid PLC & RF standard.

FIG. 2 illustrates schematically the various layers of an OSI model in the particular case of the G3-PLC Hybrid PLC & RF standard as defined in Annex H of the ITU-T recommendation G.9903 (2017) Amendment 1 (May 2021).

A message to be transmitted coming from an application layer 200 is transmitted to a transport layer 201. The transport layer 201 contains all the protocols responsible for managing errors and controlling the network flows. The two main protocols used are the TCP and UDP protocols. The transport layer 201 creates packets by adding headers to the data coming from the application layer 200. The packets are next transmitted to the IP 202 layer, e.g. IPv6. The IP 202 layer encapsulates the packets coming from the transport layer 201 by adding in particular an IP header, e.g. IPv6. An IPv6 packet can do up to 1400 bytes. In the case where the packet has a size above a threshold value, this packet is fragmented into at least two fragments in order to adapt it to the constraints of the MAC (the English acronym for Media Access Control) layer, in particular to the size of the MAC frames.

For this purpose, the G3-PLC Hybrid PLC & RF standard incorporates the 6LoWPAN protocol, which makes it possible to adapt IPv6 data packets to the constraints of the MAC layers, in particular by fragmenting them. This is because the MAC frames used are of much smaller sizes (400 bytes maximum available per packet for the IP part) than the IPv6 packets of 1400 bytes.

The IPv6 packets are transmitted to an adaptation sublayer 203a that incorporates the 6LoWPAN protocol, which where applicable fragments them. Naturally, in the case of an IPv6 packet that is sufficiently small to be contained in a single G3-PLC MAC or RF MAC frame, no fragmentation is performed.

A hybrid abstraction layer 203b next transfers the fragment, or the IP packet in the case of absence of fragmentation, to the appropriate MAC sublayer 204a or 204b according to the medium selected for transmission thereof.

Hereinafter the term fragment is used for designating both a fragment obtained from a fragmented IP packet or the IP packet itself in the case of absence of fragmentation.

Transmitting a fragment on the PLC medium, i.e. on the powerline, conventionally comprises various steps, in particular a segmentation of the fragments in order to adapt them to a G3-PLC physical layer PHY 205a, and an OFDM modulation of the signal. The segmentation consists in partitioning a MAC frame into PSDUs (the English acronym for "PHY Service Data Unit"). All the PSDUs coming from one and the same fragment are modulated using the same modulation scheme.

Transmitting a fragment by radio frequency over the RF channel comprises various steps, in particular a segmentation of the fragments in order to adapt them to an RF physical layer PHY 205b and a SUN-FSK modulation of the signal. As in the PLC case, the segmentation consists in partitioning a MAC (the English acronym for Media Access Control) frame into PSDUs (the English acronym for "PHY Service Data Unit"). All the PSDUs coming from one and the same fragment are modulated using the same modulation scheme. The specification of the RF PHY physical layer is given in sections 10, 11 and 20 of IEEE 802.15.4-2015 as amended by IEEE 802.15.4v:2017 and supplemented by Table H-5-1 of the ITU-T recommendation G.9903 (2017) Amendment 1 (May 2021).

It should be noted that the G3-PLC Hybrid PLC & RF standard defined in Table H.6.8 of annex H imposes constraints on the time of use, on a sliding time window, of the RF radio channel by each node device. For this purpose, three predetermined values and one degree are defined:

macDutyCyclePeriod_RF: a first predetermined value that defines a duration of a sliding time window in seconds (for example: 3600), macDutyCycleLimit_RF: a second predetermined value that defines an absolute time limit of authorised use on the sliding time window in seconds (for example: 90 for the meters and 360 for the data concentrator), macDutyCycleThreshold_RF: a third predetermined value that defines, for each meter and each concentrator, a maximum threshold of use of the authorised time before interrupting any RF transmission, expressed as percents (for example, 90, which means that the transmissions are stopped when 90% of 90 seconds out of the last 3600 seconds is reached for the meters, or 90% of 360 seconds out of the 3600 last seconds for the data concentrator), macDutyCycleUsage_RF: a degree of use of the transmission by radio frequency. This degree of use is calculated on the sliding window with respect to the second predetermined value, i.e. macDutyCycleLimit_RF. The ITU-T recommendation G.9903 (2017) Amendment 1 (May 2021) indicates in table H.6.8 that macDutyCycleUsage_RF=tps/macDutyCycleLimit_RF*100 where tps is the total current time of use of the transmission by radio frequency on the sliding time window by the node device.

Figure 3:
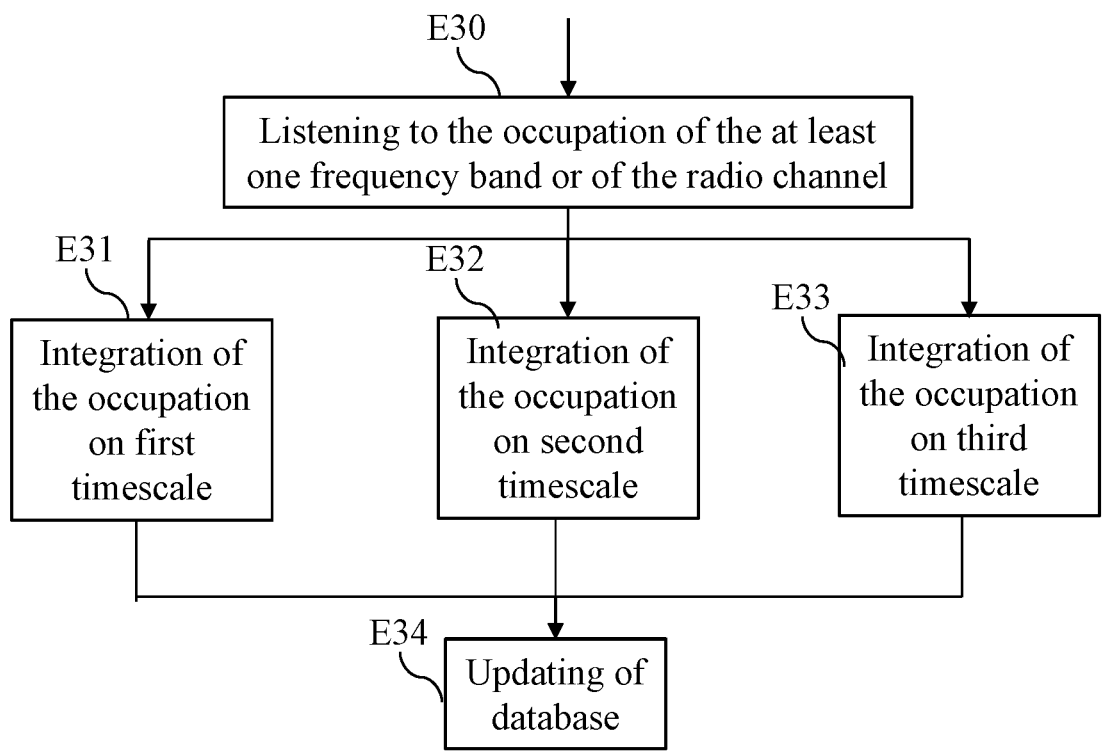
FIG. 3 illustrates schematically a method for generating and updating a database for at least one frequency band or for the radio channel of the communication network according to the present invention.
Figure 4:
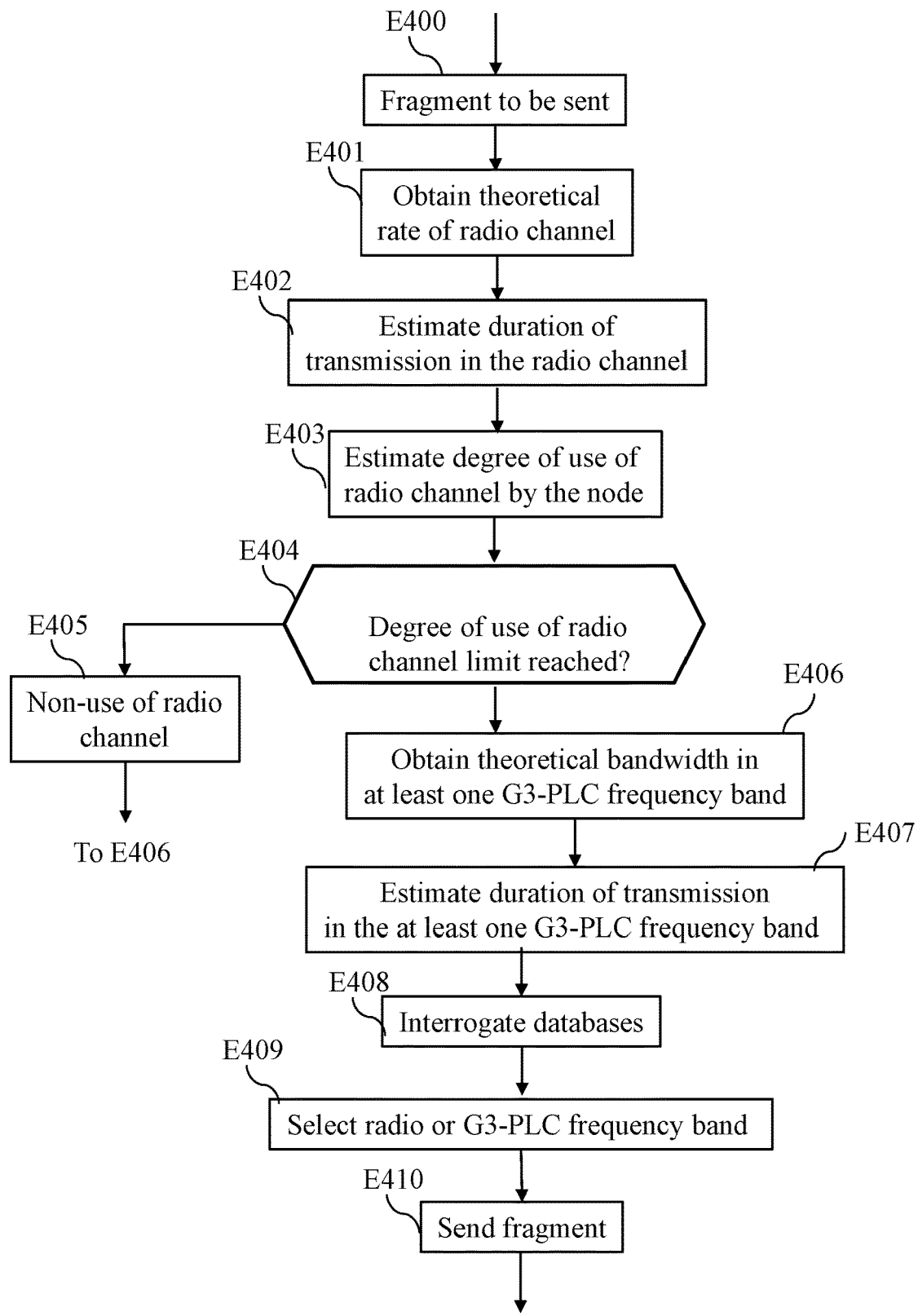
FIG. 4 illustrates schematically a method for selecting at least one frequency band or the radio channel of the communication network for sending a message according to the present invention.

In order to use all the flexibility offered by PLC/RF hybridisation, the communication methods described with reference to FIGS. 3 and 4 are implemented for distributing the fragments supplied by the adaptation sublayer between the two MAC RF and MAC PLC layers optimally. More precisely, the methods described are implemented at the hybrid abstraction layer.

FIG. 3 illustrates schematically a method for generating and updating a database for at least one frequency band or for the radio channel of the communication network according to the present invention.

The method is executed continuously for each node device that is able to send and receive messages over at least one frequency band and the radio channel of the communication network.

The least one frequency band is selected from all the frequency bands enabled by G3-PLC, i.e. CENELEC A, CENELEC B, and ARIB or FCC.

In a particular embodiment, the method is executed continuously for a plurality of frequency bands in all the frequency bands by G3-PLC, i.e. CENELEC A, CENELEC B, and ARIB or FCC.

At the step E30, the node device determines the degree of occupation of a frequency band or of the radio channel. The degree of occupation of a G3-PLC frequency band is for example determined using the mechanism used in the listening method of a multiple access medium CSMA/CA (Carrier Sense Multiple Access with Collision Avoidance). The mechanism makes it possible to check at all times whether the frequency band is occupied or not. The degree of occupation is calculated by measuring during the time window the time of occupation of the frequency band.

The degree of occupation of the radio channel is for example determined by measuring during the time window the time of occupation of the radio channel.

For example, the time window is equal to one minute and the degree of occupation indicates, for the minute, the number of seconds during which the frequency band or the radio channel is occupied.

At the step E31, the node device integrates the degrees of occupation determined during a first timescale. The first timescale is for example equal to a minute. For example, the node device calculates the mean of the sixty degrees of occupation determined during the minute.

The result of the integration is next stored at the step E34 in a database in association with a time marker.

The database comprises a first given number of results of integrations during the first timescale over a first period. For example, the first period is equal to one hour and the first given number is equal to sixty.

For example, the first duration is equal to twenty-four hours and the first given number is equal to one thousand four hundred.

At the step E32, the node device integrates the degrees of occupation determined during a second timescale. The second timescale is longer than the first timescale. The second timescale is for example equal to an hour. For example, the node device calculates the mean of the three thousand six hundred degrees of occupation determined during the hour.

The result of the integration is next stored at the step E34 in a database in association with a timestamping.

The database comprises a second given number of results of integrations during the second timescale over a second period. For example, the second period is equal to twenty-four hours and the second given number is equal to twenty-four.

For example, the second period is equal to twenty-four hours and the second given number is equal to one hundred and sixty-eight.

At the step E33, the node device integrates the degrees of occupation determined during a third timescale. The third timescale is longer than the second timescale. The third timescale is for example equal to twenty-four hours. For example, the node device calculates the mean of the two hundred and sixteen thousand degrees of occupation determined during twenty-four hours.

The result of the integration is next stored at the step E34 in a database in association with a time marker.

The database comprises a third given number of results of integrations during the third timescale over a third period. For example, the third period is equal to seven days and the third given number is equal to seven.

For example, the third period is equal to seven days and the third given number is equal to twenty-eight.

FIG. 4 illustrates schematically a method for selecting at least one frequency band or the radio channel of the communication network for sending a message according to the present invention.

The method is executed whenever a message is sent by each node device that is able to send and receive messages on at least one frequency band and over the radio channel of the communication network.

The associated frequency bands are for example selected from all the frequency bands enabled by G3-PLC, i.e. CENELEC A, CENELEC B, and ARIB or FCC.

At the step E400, the node device has a fragment to send on the communication network.

At the step E401, the node device obtains the theoretical transmission rate of the radio channel.

At the step E402, the node device estimates, for the radio channel, the theoretical duration of transmission of the fragment over the radio channel.

At the step E403, the node device estimates the cumulative degree of use, by the node device, of the RF radio channel as a percent while considering that the fragment is transmitted over the radio channel.

At the step E404, the node device checks whether the estimated degree of use macDutyCycleUsage_RF is lower than the third predetermined value macDutyCycleThreshold_RF.

If so, the node device passes to the step E406, if not, the node device passes to the step E405.

At the step E405, the node device prevents selection of the radio channel for transmitting the fragment and passes to the step E406.

At the step E406, the node device obtains the theoretical transmission rate of one or more frequency bands on which the node device is able to send and receive messages.

As mentioned previously, each frequency band has, for each type of modulation used on the frequency band, a given theoretical rate. The node device obtains the theoretical rate of the or each frequency band on which the node device is able to send and receive messages corresponding to the modulation used for sending the fragment to the node to which the fragment must be transferred.

At the step E407, the node device estimates, for the or each frequency band, the theoretical duration of transmission of the fragment on the or each frequency band.

At the step E408, the node device interrogates the database to obtain the results of integration corresponding to the theoretical duration of transmission of the fragment in each frequency band and over the radio channel if selection of the radio channel is not prohibited.

Thus the node device obtains, for the radio channel if selection of the radio channel is not prohibited or for the or each frequency band, the number of results of integrations during the first timescale corresponding to the theoretical duration of transmission of the fragment in the frequency band and in the radio channel if selection of the radio channel is not prohibited. The node device obtains the number of results of integrations during the second timescale corresponding to the time at which the fragment must be sent. The node device obtains the number of results of integrations during the third timescale corresponding to the day on which the fragment must be sent.

At the step E409, the node device selects the frequency band or the frequency band from the frequency bands, or the radio channel if selection of the radio channel is not prohibited, for which the integration results are the lowest.

For example, the node device calculates, for the or each frequency band and for the radio channel if selection of the radio channel is not prohibited, the mean of the results of integrations during the first, second and third timescales and selects the frequency band for which the calculated mean is the lowest.

In a variant, a weight is allocated to the results of integrations during the first, second and third timescales before the mean is calculated.

For example a weight of 10 is allocated to the results of integrations during the first timescale, a weight of 12 is allocated to the results of integrations during the second timescale and a weight of 7 is allocated to the results of integrations during the third timescale.

At the step E410, the node device transfers the fragment onto the frequency band selected or onto the radio band if the radio channel has been selected.

It should be noted here that, if the node device is able to transmit and/or receive messages on a single frequency band and selection of the radio channel is prohibited, the node device does not perform the steps E406 to E409 and transfers the fragment onto the frequency band where it is able to transmit and/or receive messages.

Figure 5:
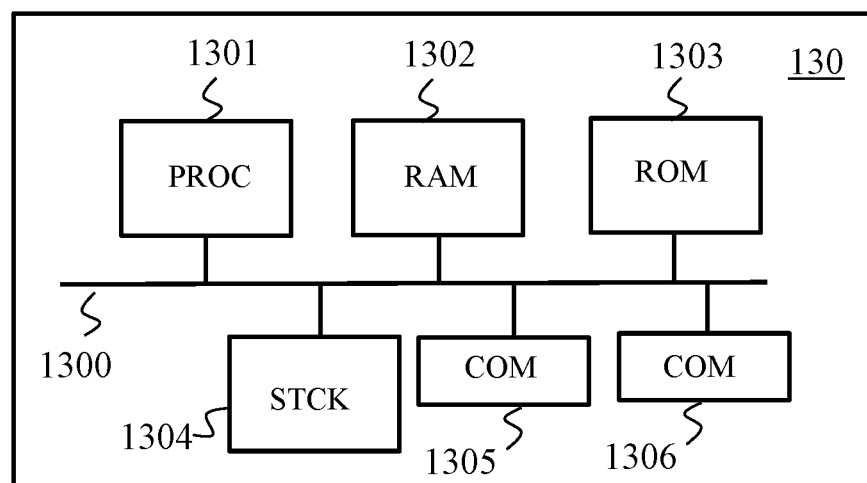
FIG. 5 illustrates schematically an example of hardware architecture of a node device of the communication network according to one embodiment.

FIG. 5 illustrates schematically an example of hardware architecture of a node device of the communication network according to one embodiment.

Such a node device is termed multiband since it is capable of transmitting a message on a plurality of frequency bands. It should be noted that FIG. 5 could also schematically illustrate an example of hardware architecture of a processing module included in the node device.

According to the example of hardware architecture shown in FIG. 5, the node device 130 then comprises, connected by a communication bus 1300: a processor or CPU (central processing unit) 1301; a random access memory RAM 1302; a read only memory ROM 1303; a storage unit such as a hard disk (or a storage medium reader, such as an SD (Secure Digital) card reader 1304; at least one communication interface 1305 enabling the node device 130 to communicate with the node devices belonging to its neighbourhood, e.g. the nodes 131 and 133.

The processor 1301 is capable of executing instructions loaded in the RAM 1302 from the ROM 1303, from an external memory (not shown), from a storage medium (such as an SD card), or from a communication network. When the node device is powered up, the processor 1301 is capable of reading instructions from the RAM 1302 and executing them. These instructions form a computer program causing the implementation, by the processor 1301, of all or some of the methods described in relation to FIGS. 3 and 4.

The methods described below in relation to FIGS. 3 and 4 can be implemented in software form by executing a set of instructions by a programmable machine, for example a DSP (Digital Signal Processor) or a microcontroller, or be implemented in hardware form by a machine or a dedicated component, for example an FPGA (field-programmable gate array) or an ASIC (application-specific integrated circuit). In general, the node device 130 comprises electronic circuitry configured for implementing the methods described in relation to FIGS. 3 and 4.

The invention claimed is:

1. A method for transmitting a message from a first node device to a second node device belonging to a neighbourhood of said first node device, said first and second node devices belonging to an electrical supply network using powerline communications, wherein the first node device is able to send and receive fragments of messages on at least one frequency band of the electrical supply network using powerline communications or over a radio channel and said method causes the first node device and comprises the steps, prior to the transmission of the fragment, to perform:
    estimating, for the radio channel, a theoretical duration of transmission of the fragment over the radio channel,
    estimating a cumulative degree of use, by the first node device, of the radio channel while considering that the fragment is transmitted over the radio channel and, when the estimated degree of use is below a maximum use threshold, the method further comprising the steps of:
    estimating, for the at least one frequency band, a theoretical duration of transmission of the fragment on the at least one frequency band,
    obtaining, from a database, a result of integration of a degree of occupation of the at least one frequency band determined during several timescales corresponding to the theoretical duration of transmission of the fragment on the at least one frequency band,
    obtaining, from the database, a result of integration of the degree of occupation of the radio channel determined during several timescales corresponding to the theoretical duration of transmission of the fragment over the radio channel,
    selecting, from the results of integration of the degree of occupation of the at least one frequency band and of the radio channel, the at least one frequency band or the radio channel,
    transmitting the fragment on the at least one frequency band or over the radio channel according to the selection.

2. The method according to claim 1, wherein when the estimated degree of use is not below a maximum use threshold, the method comprises the step of transmitting the fragment on the frequency band.

3. The method according to claim 1, wherein the results of integration of the degree of occupation of the at least one frequency band and of the radio channel are determined during three timescales, a second timescale being longer than a first timescale and shorter than a third timescale.

4. The method according to claim 3, wherein the first timescale is equal to a minute, the second timescale is equal to an hour, and the third timescale is equal to a day.

5. The method according to claim 3, wherein the database stores the results of integration of the degree of occupation of the at least one frequency band and of the radio channel determined during the first timescale over a period of one hour, stores the results of integration of the degree of occupation of the at least one frequency band and of the radio channel determined during the second timescale over a period of twenty-four hours, and stores the results of integration of the degree of occupation of the at least one frequency band and of the radio channel determined during the third timescale over a period of one week.

6. The method according to claim 1, wherein the at least one frequency band forms part of a set of frequency bands comprising:
   the CENELEC A frequency band;
   the CENELEC B frequency band; and
   the FCC frequency band or the ARIB frequency band.

7. A device for transmitting a message from a first node device to a second node device belonging to a neighbourhood of said first node device, said first and second node devices belonging to an electrical supply network using powerline communications, wherein the first node device is able to send and receive fragments of messages on at least one frequency band of the electrical supply network using powerline communications or over a radio channel, and the first node device comprises circuitry causing the first node device, prior to the transmission of the fragment, to perform:
   estimating, for the radio channel, a theoretical duration of transmission of the fragment over the radio channel,
   estimating a cumulative degree of use, by the first node device, of the radio channel while considering that the fragment is transmitted over the radio channel and, when the estimated degree of use is below a maximum use threshold,
   estimating, for the at least one frequency band, a theoretical duration of transmission of the fragment on the at least one frequency band,
   obtaining, from a database, a result of integration of a degree of occupation of the at least one frequency band determined during several timescales corresponding to the theoretical duration of transmission of the fragment on the at least one frequency band,
   obtaining, from the database, a result of integration of the degree of occupation of the radio channel determined during several timescales corresponding to the theoretical duration of transmission of the fragment over the radio channel,
   selecting, from the results of integration of the degree of occupation of the at least one frequency band and of the radio channel, the at least one frequency band or the radio channel,
   transmitting the fragment on the at least one frequency band or over the radio channel according to the selection.

8. A non-transitory storage medium that stores a computer program comprising instructions for implementing, by the first node device, the method according to claim 1, when said program is executed by a processor of the first node device.

* * * * *